United States Patent [19]

Ducloux

[11] 4,067,897
[45] Jan. 10, 1978

[54] HEAT-RESISTANT FLAMEPROOF COMPOSITIONS

[75] Inventor: Maurice Ducloux, Lyon, France

[73] Assignee: Rhone-Poulenc Industries, Paris, France

[21] Appl. No.: 663,357

[22] Filed: Mar. 3, 1976

[30] Foreign Application Priority Data

Mar. 13, 1975 France .................................. 75 07897

[51] Int. Cl.$^2$ ............................................. C08K 3/02
[52] U.S. Cl. .......................... 260/45.7 P; 260/78 TF; 260/DIG. 24; 428/268; 428/276; 428/285
[58] Field of Search .................................. 260/45.7 PE

[56] References Cited

U.S. PATENT DOCUMENTS

| | | | |
|---|---|---|---|
| 3,330,783 | 7/1967 | Piechota et al. | 260/2.5 AJ |
| 3,546,160 | 12/1970 | Dany et al. | 260/45.7 PE |
| 3,562,223 | 2/1971 | Bargain et al. | 260/78 UA |
| 3,663,654 | 5/1972 | Haaf | 260/45.7 PE |
| 3,763,057 | 10/1973 | Diehr | 260/45.7 PE |
| 3,847,861 | 11/1974 | Largman et al. | 260/45.7 PE |
| 3,878,162 | 4/1975 | Breitschaft | 260/45.7 PE |
| 3,883,475 | 5/1975 | Racky et al. | 260/45.7 PE |

Primary Examiner—Donald E. Czaja
Assistant Examiner—R. A. White
Attorney, Agent, or Firm—Stevens, Davis, Miller & Mosher

[57] ABSTRACT

Heat-curable compositions are disclosed based on a prepolymer obtained by reacting (a) a N,N'-bis-imide of an unsaturated dicarboxylic acid of the formula

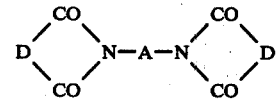

in which D represents a divalent radical containing a carbon-carbon double bond and A is a divalent radical which possesses at least 2 carbon atoms, and (b) a di-primary diamine of the general formula $NH_2-B-NH_2$, in which B represents a divalent radical which does not have more than 30 carbon atoms, in a ratio of number of mols of bis-imide/number of mols of diamine of between 1.2 and 5, the composition containing up to 15% by weight, relative to the weight of the prepolymer, of red phosphorus in the form of a powder having a mean particle size of less than 200μ.

6 Claims, No Drawings

HEAT-RESISTANT FLAMEPROOF COMPOSITIONS

The present invention relates to heat-resistant flameproof compositions.

It is well known that polyimides prepared by heating prepolymers, themselves obtained by reacting an N,N'-bis-imide of an unsaturated dicarboxylic acid and a di-primary diamine in the proportions and under the conditions described in U.S. Pat. No. 3,562,223, withstand severe heat exposures and have good mechanical properties. These resins which can be converted, by suitable means, into shaped articles, or which can be used as coatings or as adhesives, have flameproof properties of a high order but these properties require still further improvement in certain cases.

In fact, for an increasing number of uses, particularly in the aeronautics industry and aero-space industry, the requirements relating to inflammability, self-extinguishability and flame propagation resistance of polymers are becoming more and more severe and restrictive.

The object of the present invention is precisely to impart improved flameproof properties to polyimides without employing, for that purpose, products which might produce undesirable residues or cause the evolution of noxious or toxic gases.

Heat-curable compositions in accordance with the present invention have been found, based on prepolymers obtained by reacting (a) an N,N'-bis-imide of an unsaturated carboxylic acid of the formula

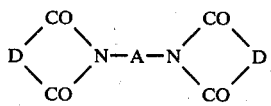

in which D represents a divalent radical containing a carbon-carbon double bond and A is a divalent radical which possesses at least 2 carbon atoms, and (b) a di-primary diamine of the general formula $NH_2-B-NH_2$, in which B represents a divalent radical which does not have more than 30 carbon atoms, in a ratio of number of mols of bis-imide/number of mols of diamine of between 1.2 and 5, the compositions being characterized in that they contain up to 15% by weight, and preferably, from 1 to 8% by weight, relative to the prepolymer of red phosphorus in the form of a powder having a mean particle size of less than 200μ.

The prepolymers employed in accordance with the invention have been described in U.S. Pat. No. 3,562,223.

It is especially advantageous to use prepolymers obtained by reaction of (a) a bis-imide of the formula

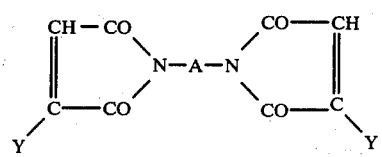 (I)

and (b) a diamine of the formula $NH_2-B-NH_2$ (II), in which formulae the symbol Y represents H, $CH_3$ or Cl and the symbols A and B, which may be identical or different, represent a phenylene or cyclohexylene radical or a radical

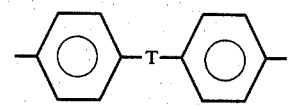

where T represents $-CH_2-$, $-C(CH_3)_2-$, $-O-$, $-SO_2-$ or $-S-$.

The following may be mentioned by way of illustration of the bis-imides of the formula (I): N,N',4,4'-diphenylmethane-bis-maleimide; N,N',4,4'-diphenylether-bis-maleimide; N,N',4,4'-diphenylsulphone-bis-maleimide; N,N',4,4'-diphenylsulphide-bis-maleimide; N,N',4,4'-(2",2"-diphenyl-propane)-bis-maleimide; N,N'-para-phenylene-bis-maleimide; N,N'-meta-phenylene-bis-maleimide; and N,N',4,4'-diphenylmethane-bis-chloromaleimide.

The following may be mentioned by way of illustration of the diamines of the formula (II): para-phenylenediamine; meta-phenylenediamine; bis-(4-aminophenyl)-methane; bis-(4-aminophenyl)ether; bis-(4-aminophenyl)-sulphone; and bis-(4-aminophenyl)-sulphide.

These prepolymers may be prepared by bulk polymerization, the reaction being initiated by heating a mixture of the reactants. The temperature at which the reaction starts may vary within fairly wide limits depending on the nature of the reactants employed but as a general rule is between 50° and 250° C and mostly between 110° and 200° C. Depending on the physical condition of the reactants used, it is possible to employ conventional techniques for mixing finely divided solids or to dissolve or disperse one of the reactants in the other, which is kept in the liquid state.

Depending on the temperature, the nature and proportions of the reactants used, and the desired degree of advancement of the reaction, the duration of heating can vary within fairly wide limits but is generally between 5 minutes and 3 hours.

The prepolymers may also be prepared by heating the reactants in a polar diluent which is inert and liquid at the temperature employed (between 50° and 250° and preferably between 110° and 200° C). Amongst the diluents which can be used there may in particular be mentioned polar solvents such as dimethylformamide, N-methylpyrrolidone, dimethylacetamide, N-methylcaprolactam, diethylformamide, N-acetylpyrrolidone, and the cresols.

The amount of diluent generally constitutes from 0.2 to 20 times the weight of the bis-imide introduced.

These prepolymers, which may be isolated and may, if desired, be purified and stored, are, at ambient temperature, generally in the form of solids which may be reduced to a powder, or they may be in the form of viscous liquids.

The mixture with red phosphorus (which is generally in the form of a powder) is produced by any per se known method of mixing and homogenization of powders or of a powder and a liquid.

Mixtures of phosphorus and the starting compounds used in the preparation of the prepolymer also fall within the scope of the invention.

Furthermore, it is to be understood that, using techniques, which are now well known, the polyimide resin can be modified by using, in addition to the bis-imide (I) and the diamine (II), various adjuvants such as, for example, monoimides (according to French Pat. No.

2,046,498), primary monoamines and/or secondary monoamines or polyamines (according to French Pat. No. 2,022,609), monomers, other than maleimides, which contain polymerizable $CH_2 = C<$ groups (according to British Pat. No. 1,355,401) or unsaturated polyesters (according to U.S. Pat. No. 3,712,933).

By red phosphorus is to be understood all the colored allotropic varieties thereof, namely red phosphorous, violet phosphorous, or black phosphorus, which are sold commercially under the description "red phosphorus" and which may contain up to 3% of oxides or of metal salts as stabilizers.

To achieve the maximum effect the red phosphorus must be as thoroughly dispersed in the prepolymer as possible. It is generally used in the form of particles having a mean diameter of less than 200μ, and preferably between 0.1 and 100μ.

It is obvious that the compositions according to the present invention intended especially for the production of shaped articles may contain various adjuvants, of which those most commonly used are fillers, such as fibrous reinforcing fillers and fillers intended to impart specific desired characteristics to the shaped articles, antioxidants, various stabilizers as well as pigments or dyestuffs. The compositions according to this invention can also be used for the manufacture of laminates.

The examples which follow still better illustrate the invention:

EXAMPLE 1

18 g of a mixture homogenized on rollers and consisting of 5% by weight of red phosphorous powder having a mean particle size of 20 - 30μ and 95% of a prepolymer obtained by the reaction of 2.5 mols of 4,4'-bis-maleimido-diphenylmethane and 1 mol of 4,4'-diamino-diphenylmethane, and having a softening point of 148° C, are introduced into a circular mold of 75 mm diameter. The above prepolymer is prepared by heating the two reactants at 150° C for 45 minutes.

The mold is introduced between the platens of a press heated to 250° C.

A pressure of 200 bars is applied for 1 hour.

The molded article is withdrawn and reheated for 24 hours at 250° C.

Small plates of size 50 mm × 6 mm × 3 mm are cut from the molded article and the "limiting oxygen index" is measured by the LOI test in accordance with Standard Specification ASTM D 2863.

More small plates were prepared under otherwise the same conditions but without adding the red phosphorus.

The following results are obtained:

|  | L.O.I. Index |
|---|---|
| polyimide reference sample | 29 |
| polyimide + red phosphorus | 45 |

As can be seen, the flameproof properties of the polyimide alone, which were already good (an LOI index of 29) are improved very considerably by the addition of 5% of red phosphorus.

It was found furthermore that in the course of the preparation of the small plates, of their heat treatment and of the LOI test, there was no evolution of a toxic gas such as phosphine. On using various method such as trapping gases by means of an aqueous solution of mercury chloride, or using a Draegger tube, it was not possible to detect any trace thereof.

EXAMPLE 2

The following composition is mixed and homogenized: 110 g of N-methylpyrrolidone, 90 g of the same prepolymer as that used in Example 1, and 4.5 g of red phosphorus powder (particle size 20 - 30μ).

This rather viscous composition is applied by brushing to the two faces of a glass fabric weighing about 300 g/m². The coated article is dried for 5 minutes in a ventilated oven at 130° C. A second layer is applied. This is dried and the residual solvent is then evaporated by heating for 30 minutes at 130° C under a pressure reduced to 40 cm of mercury.

The amount of prepolymer and of red phosphorus thus deposited represents about 38% of the total weight of the coated article.

14 samples of size 14 × 14 cm are stacked and compressed by means of a press, the platens of which are at 160° C, under a pressure of 3 bars.

The temperature and the pressure are increased simultaneously so as to bring the pressure to 40 bars at the end of 10 minutes and the temperature to 200° C at the end of 30 minutes.

The material is kept for 30 minutes at 200° C under 40 bars.

It is then allowed to cool whilst maintaining the pressure.

A laminate is obtained. This is then reheated for 48 hours at 250° C.

Samples of size 127 mm × 12.7 mm, and of a thickness of about 3 mm, are cut from the laminate and subjected to the UL (Underwriters Laboratories) test 94 described in document BNMP 9,750/1 of the (French) Bureau for the Standardisation of Plastics. This laminate gave a classification 94 VE - O.

An otherwise similar laminate in which however the impregnation composition did not contain red phosphorous was prepared under the same conditions. This laminate gave a classification of 94 VE - 1 in the UL test.

What is claimed is:

1. A heat-curable composition based on a prepolymer obtained by reacting (a) an N,N'-bis-imide of an unsaturated dicarboxylic acid of the formula

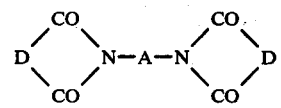

in which D represents a divalent radical containing a carbon-carbon double bond and A is a divalent radical which possesses at least 2 carbon atoms, and (b) a di-primary diamine of the general formula $NH_2 - B - NH_2$, in which B represents a divalent radical which does not have more than 30 carbon atoms, in a ratio of number of mols of bis-imide/number of mols of diamine of between 1.2 and 5, wherein the composition contains up to 15% by weight, relative to the weight of the prepolymer, of red phosphorus in the form of a powder having a mean particle size of less than 200μ.

2. A composition according to claim 1, in which the amount of red phosphorus represents from 1 to 8% of the weight of the prepolymer.

3. A composition according to claim 1, wherein the red phosphorus powder has a mean particle size of from 0.1 to 100μ.

4. A heat-curable composition based on a prepolymer obtained by reacting (a) a bis-imide of the formula

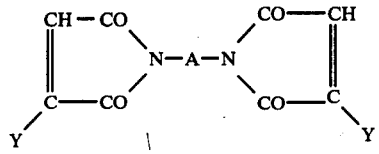 (I)

and (b) a diamine of the formula $NH_2 - B - NH_2$ (II), in which formulae the symbol Y represents H, $CH_3$ or Cl and the symbols A and B, which may be identical or different, represent a phenylene or cyclohexylene radical or a radical

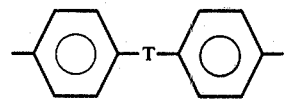

where T represents $-CH_2-$, $-C(CH_3)_2-$, $-O-$, $-SO_2-$ or $-S-$, in a ratio of number of mols of bis-imide/number of mols of diamine of between 1.2 and 5, wherein the composition contains up to 15% by weight, relative to the weight of the prepolymer, of red phosphorus in the form of a powder having a mean particle size of less than 200μ.

5. A composition according to claim 4, in which the amount of red phosphorus represents from 1 to 8% of the weight of the prepolymer.

6. A composition according to claim 4, wherein the red phosphorous powder has a mean particle size of from 0.1 to 100μ.